(No Model.)

G. F. MEYER.
APPARATUS FOR EXTRACTING SALT FROM MEATS.

No. 444,500. Patented Jan. 13, 1891.

Witnesses:
W. W. Wenskey
W. Huth.

Inventor:
Dr. Georg Friedrich Meyer
by:

UNITED STATES PATENT OFFICE.

GEORG FRIEDRICH MEYER, OF BRUNSWICK, GERMANY.

APPARATUS FOR EXTRACTING SALT FROM MEATS.

SPECIFICATION forming part of Letters Patent No. 444,500, dated January 13, 1891.

Application filed October 1, 1890. Serial No. 366,724. (No model.)

*To all whom it may concern:*

Be it known that I, GEORG FRIEDRICH MEYER, of Brunswick, Germany, have invented certain new and useful Improvements in Osmose Apparatus for the Purpose of Extracting Salt from Meat, Fish, Vegetables, and Preserves, of which the following is a specification.

When extracting salt from victuals by simply watering them in the old manner, there is always a considerable loss of nutritious substances, inasmuch as these substances are dissolved by the water and afterward are thrown away in the water.

It is the object of this invention to prevent such loss of nutritious substances without hindering the extraction of the superfluous salt in the least.

In order to make my invention more clear I refer to the accompanying drawings, in which similar letters denote similar parts throughout the different figures, and in which—

Figure 1:
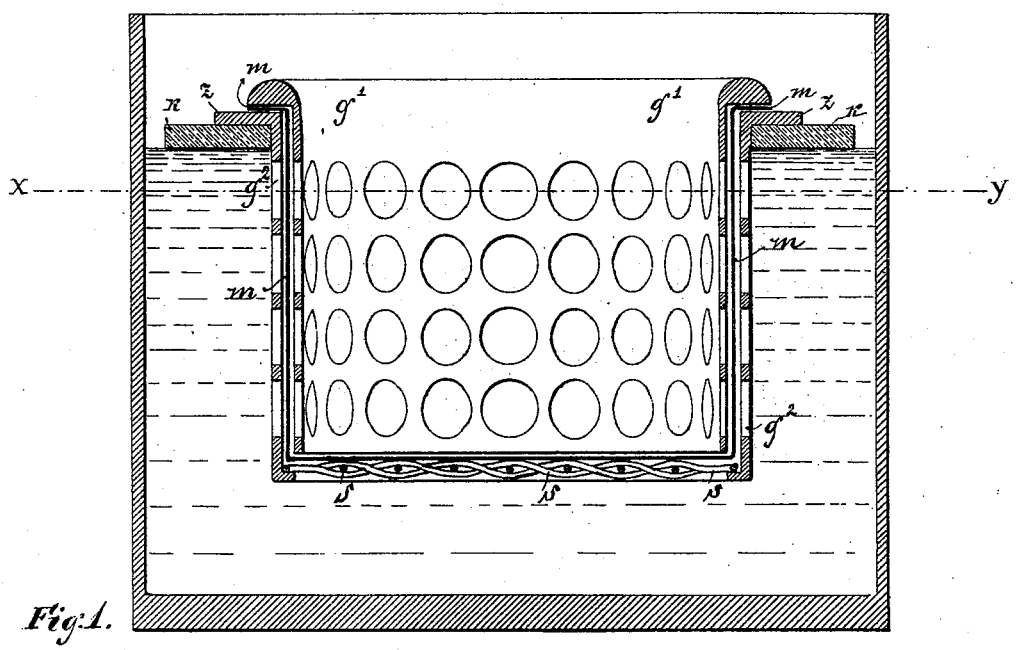
Figure 2:
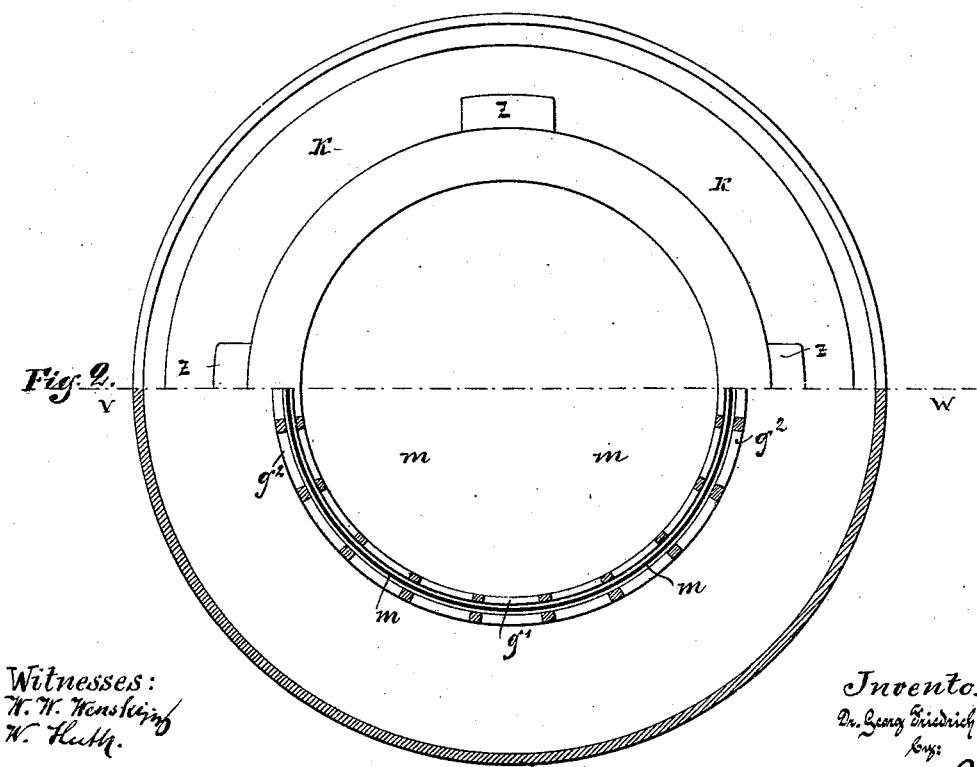

Figure 1 is a vertical section through the apparatus, taken on the line $v\,w$ of Fig. 2; and Fig. 2 is partly an upper view of the apparatus and partly a horizontal section through it, taken on the line $x\,y$ of Fig. 1.

A frame $g'$ of annular or any other shape and at top and bottom completely open, is provided with a great number of lateral openings. By covering the sides and bottom of said frame with any suitable diaphragm $m$, a vessel is formed, which is hung into another frame $g^2$ of similar form. The frame $g^2$ is also provided with a great number of lateral openings, and has, moreover, a bottom of wire-gauze adapted to hold and protect, respectively, the horizontal part of the diaphragm $m$ and the bottom of vessel $g'$. A ring of cork $k$ is attached to upper flanges $z$ of vessel $g^2$, thus rendering the whole apparatus capable of floating on water when filled.

The meat or other victuals from which the salt is to be extracted is put into the vessel $g'$, together with as much of its pickle as necessary to cover it, and the whole is placed in hot or cold water. During a comparatively short time there will be diffused so much salt through the diaphragm as to render the meat sufficiently free from salt for further use, without having lost nutritious substances of any nominal value.

It is of importance to have the apparatus swimming on water, as a quicker and much better diffusion of the salt will be obtained thereby. In consequence of the greater specific gravity of the dissolved salt it will sink down to the bottom of the last vessel, thus causing the water to move along the surface of vessel $g^2$, respectively, along the surface of the diaphragm. The apparatus may, however, be hung into the outer vessel, so as to rest upon the rim of the latter.

The apparatus could advantageously be also employed for extracting the pickle alone—for instance, of salt meat or of herrings—in order to save the nutritious substances contained therein; or the apparatus may be used for extracting salt from food that was salted too much. There are many purposes for which the apparatus may be used.

What results have been attained by the apparatus is to be seen by the following examples:

*Example 1.*—Salted herrings, two hundred grams: the osmose water contained by three and one-half hours, 3.43 grams salt; the osmose water contained by five hours, 5.78 grams salt; the pickle contained before exposed to osmose, 2.59 per cent. salt; the pickle contained after osmose of five and one-half hours, 1.64 per cent. salt.

*Example 2.*—Salted beans, nine hundred and fifty grams: beans contained before exposed to osmose, 12.10 per cent. salt; beans contained after osmose of fifteen hours, 1.67 per cent. salt; the osmose water contained in four hours, 21.52 grams salt; the osmose water contained in fifteen hours, 75.50 grams salt.

*Example 3.*—Pickle of salt pork: original capacity of salt, 14.34 volume per cent.; the pickle contained by five hours fifteen minutes, 10.15 volume per cent.; the pickle contained by ten hours five minutes, 6.14 volume per cent.; the pickle contained by twenty hours forty-five minutes, 2.72 volume per cent.

Having thus fully described the nature of this invention, what I desire to secure by Letters Patent of the United States, is—

In an apparatus for extracting salt from victuals by osmose, the two perforated vessels $g'$ $g^2$, one within the other, with the diaphragm $m$ inserted between them, in combination with a third vessel adapted to be filled with water and to receive said apparatus.

In testimony whereof I have signed this specification in the presence of two subscribing witnesses.

GEORG FRIEDRICH MEYER.

Witnesses:
LYMAN A. SPALDING,
HERMINE MITTENDORF.